(12) United States Patent
Ju et al.

(10) Patent No.: US 12,174,319 B2
(45) Date of Patent: Dec. 24, 2024

(54) AUTONOMOUS VEHICLE

(71) Applicant: APOLLO INTELLIGENT CONNECTIVITY (BEIJING) TECHNOLOGY CO., LTD., Beijing (CN)

(72) Inventors: Lijun Ju, Beijing (CN); Junping Wang, Beijing (CN); Chengfa Wang, Beijing (CN); Fan Zhu, Beijing (CN); Xiang Liu, Beijing (CN); Junkui Qiao, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 258 days.

(21) Appl. No.: 17/670,504

(22) Filed: Feb. 13, 2022

(65) Prior Publication Data

US 2022/0196802 A1 Jun. 23, 2022

Related U.S. Application Data

(63) Continuation of application No. PCT/CN2020/097817, filed on Jun. 23, 2020.

(30) Foreign Application Priority Data

Aug. 15, 2019 (CN) .......................... 201921325028.7

(51) Int. Cl.
*G01S 7/48* (2006.01)
*B60R 1/00* (2022.01)
(Continued)

(52) U.S. Cl.
CPC .............. *G01S 7/4813* (2013.01); *B60R 1/00* (2013.01); *B60R 11/04* (2013.01); *G01S 13/865* (2013.01);
(Continued)

(58) Field of Classification Search
None
See application file for complete search history.

(56) References Cited

U.S. PATENT DOCUMENTS 9,255,805 B1 2/2016 Ferguson et al.
2018/0188371 A1* 7/2018 Bao .......................... G01S 17/10
(Continued)

FOREIGN PATENT DOCUMENTS

CN 105857182 A 8/2016
CN 107351785 A 11/2017
(Continued)

*Primary Examiner* — Hovhannes Baghdasaryan
(74) *Attorney, Agent, or Firm* — Leydig, Voit & Mayer, Ltd.

(57) ABSTRACT

An autonomous vehicle includes: a plurality of side laser radars respectively provided on a plurality of side portions of the autonomous vehicle, each of the plurality of side laser radars being partially embedded in a corresponding side portion of the plurality of side portions; and a top laser radar provided on a top portion of the autonomous vehicle and configured to obtain environmental information around the autonomous vehicle together with the plurality of side laser radars. By providing the plurality of laser radars, a sensing blind spot of the autonomous vehicle may be avoided.

14 Claims, 2 Drawing Sheets

(51) Int. Cl.
   *B60R 11/04* (2006.01)
   *G01S 7/481* (2006.01)
   *G01S 13/86* (2006.01)
   *G01S 13/931* (2020.01)
   *G01S 15/86* (2020.01)
   *G01S 15/931* (2020.01)
   *G01S 17/86* (2020.01)
   *G01S 17/931* (2020.01)
   *H04N 23/51* (2023.01)

(52) U.S. Cl.
   CPC .......... *G01S 13/867* (2013.01); *G01S 13/931* (2013.01); *G01S 15/86* (2020.01); *G01S 15/931* (2013.01); *G01S 17/86* (2020.01); *G01S 17/931* (2020.01); *H04N 23/51* (2023.01); *G01S 2013/9327* (2020.01); *G01S 2015/937* (2013.01)

(56) References Cited

U.S. PATENT DOCUMENTS

| | | | |
|---|---|---|---|
| 2019/0137610 A1* | 5/2019 | Li | G01S 17/931 |
| 2019/0204845 A1* | 7/2019 | Grossman | G01S 17/931 |
| 2019/0349516 A1* | 11/2019 | Lee | H04N 23/54 |

FOREIGN PATENT DOCUMENTS

| | | |
|---|---|---|
| CN | 208238805 U | 12/2018 |
| CN | 109375635 A | 2/2019 |
| CN | 208469707 U | 2/2019 |
| CN | 109634282 A | 4/2019 |
| CN | 210390983 U | 4/2020 |
| WO | 2018196001 A1 | 11/2018 |
| WO | 2018229552 A2 | 12/2018 |
| WO | 2018229552 A3 | 12/2018 |

\* cited by examiner

AUTONOMOUS VEHICLE

CROSS REFERENCE TO RELATED APPLICATIONS

This application is a continuation of International Application No. PCT/CN2020/097817, filed on Jun. 23, 2020, which claims priority to Chinese patent application No. 201921325028.7, filed on Aug. 15, 2019, both of which are hereby incorporated by reference in their entireties for all purposes.

TECHNICAL FIELD

Embodiments of the present disclosure relate to an autonomous vehicle.

BACKGROUND

With the development of automated driving, the layout of sensors in vehicles has become more and more important. Generally, sensors are provided outside an autonomous vehicle to achieve a better field of view. However, such provision affects styling and an overall size of a vehicle, and easily causes bumps of sensors, which may lead to faults of the sensors. In addition, different types of sensors can visualize only a certain spot under particular circumstances due to their own different operating principles, causing a sensing blind spot for a vehicle.

SUMMARY

Embodiments of the present disclosure may provide an autonomous vehicle that at least partially overcomes the above-mentioned shortcomings in the art.

According to some embodiments, an autonomous vehicle is provided. The autonomous vehicle comprises: a plurality of side laser radars respectively provided on a plurality of side portions of the autonomous vehicle, each of the plurality of side laser radars being partially embedded in a corresponding side portion of the plurality of side portions; and a top laser radar provided on a top portion of the autonomous vehicle and configured to obtain environmental information around the autonomous vehicle together with the plurality of side laser radars.

In some embodiments, the plurality of side laser radars comprise: a first laser radar provided on a front side of the autonomous vehicle and partially embedded in the front side: a second laser radar provided on a left side of the autonomous vehicle and partially embedded in the left side: a third laser radar provided on a right side of the autonomous vehicle and partially embedded in the right side; and a fourth laser radar provided on a rear side of the autonomous vehicle and partially embedded in the rear side.

In some embodiments, the second laser radar is located in the front end or rear end of the left side; and/or the third laser radar is located in the front end or rear end of the right side.

In some embodiments, an embedded portion of each of the plurality of side laser radars has a radius not more than the radius of the side laser radar.

In some embodiments, the top laser radar is provided in the front end or rear end of the top portion.

In some embodiments, a central axis of the first laser radar tilts downward by 5 to 10 degrees with respect to the front side; and/or a central axis of the fourth laser radar is parallel to the rear side.

In some embodiments, a central axis of the top laser radar tilts by 5 to 15 degrees with respect to a vertical direction.

In some embodiments, the autonomous vehicle further comprises: a plurality of cameras horizontally provided on the front side of the autonomous vehicle and configured to collect an optical image in front of the autonomous vehicle, the plurality of cameras having focal lengths different from each other; and a wide-angle camera provided on the rear side of the autonomous vehicle and configured to collect an optical image behind the autonomous vehicle.

In some embodiments, the autonomous vehicle further comprises: a first millimeter-wave radar provided on the front side of the autonomous vehicle and configured to collect a microwave image in front of the autonomous vehicle; and/or a second millimeter-wave radar provided on the rear side of the autonomous vehicle and configured to collect a microwave image behind the autonomous vehicle.

In some embodiments, the autonomous vehicle further comprises: a plurality of ultrasonic radars respectively provided on the plurality of side portions of the autonomous vehicle and configured to collect an ultrasound image around the autonomous vehicle.

In some embodiments, the autonomous vehicle is an L4 autonomous vehicle.

According to some embodiments of the present disclosure, a side laser radar is partially embedded in an autonomous vehicle, so that the attractiveness of the vehicle is improved, and sensors are not prone to faults such as bumps. In addition, a plurality of laser radars are provided, so that the fields of view of the laser radars can be guaranteed. Moreover, different types of sensors are provided, so that the sensing blind spot of an autonomous vehicle may be further avoided.

BRIEF DESCRIPTION OF THE DRAWINGS

The above and other features, advantages, and aspects of various embodiments of the present disclosure will become more apparent in conjunction with the drawings and with reference to the following detailed description. In the accompanying drawings, the same or similar reference signs represent the same or similar elements, in which.

DETAILED DESCRIPTION

Figure 1:
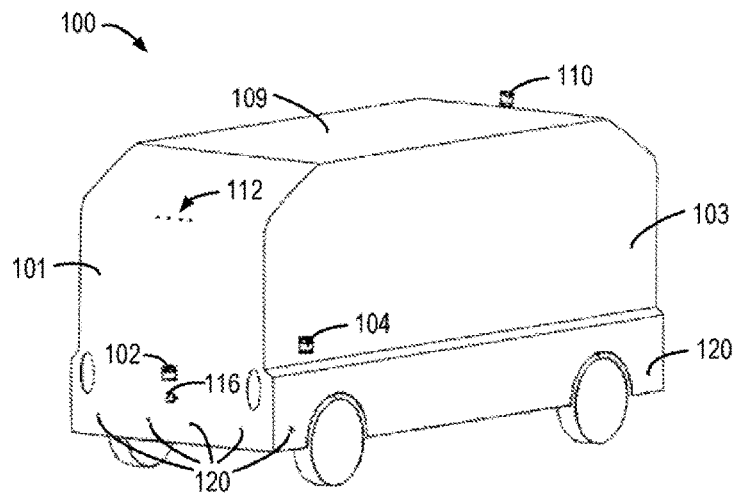
FIG. 1 is a perspective view of an autonomous vehicle according to some embodiments of the present disclosure.

Concepts of the present disclosure are illustrated now with reference to various exemplary embodiments shown in the drawings. It should be understood that descriptions of these embodiments are merely intended to assist those skilled in the art to better understood and further implement the present disclosure, but not intended to limit the scope of the present disclosure in any manner. It should be noted that similar or the same reference signs may be used in the drawings in feasible cases, and similar or the same reference signs may denote similar or the same elements. Those skilled in the art will understand from the descriptions below that alternative embodiments of the structure and/or method illustrated herein may be adopted without departing from the principles and concepts described in the present disclosure.

In the context of the present disclosure, the term "comprise" and variants thereof may be understood as an open term, which means "including but not limited to": the term "based on" may be understood as "at least partially based on": the term "an embodiment" may be understood as "at least one embodiment"; and the term "another embodiment" may be understood as "at least one further embodiment". Other terms that may occur but are not mentioned here, unless specifically specified, should not be explained or defined in a manner that is contradictory to the concepts on which the embodiments of the present disclosure are based.

When corresponding embodiments or examples are described in conjunction with the drawings, terms related to directions are intended to facilitate the comprehension of the embodiments of the present disclosure, such as "upper (portion)", "lower (portion)", "vertical", "horizontal (transverse)", "longitudinal", "top (portion)", and "bottom (portion)". They are either based on the direction presented by the reader when watching the views, or based on the normal use direction of the product itself, and will not undesirably limit the scope of protection of the present disclosure.

Figure 2:
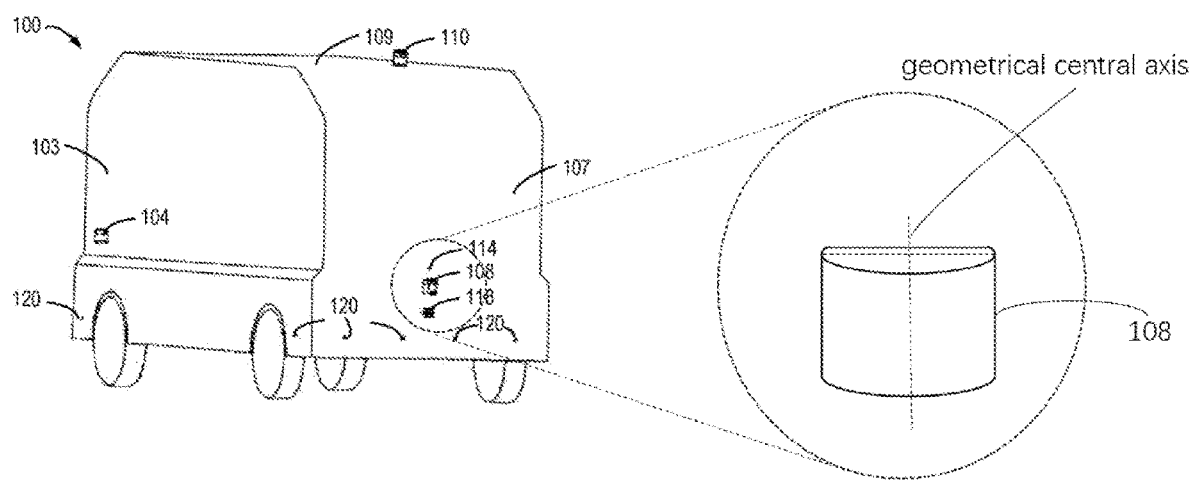
FIG. 2 is another perspective view of an autonomous vehicle according to some embodiments of the present disclosure.
Figure 3:
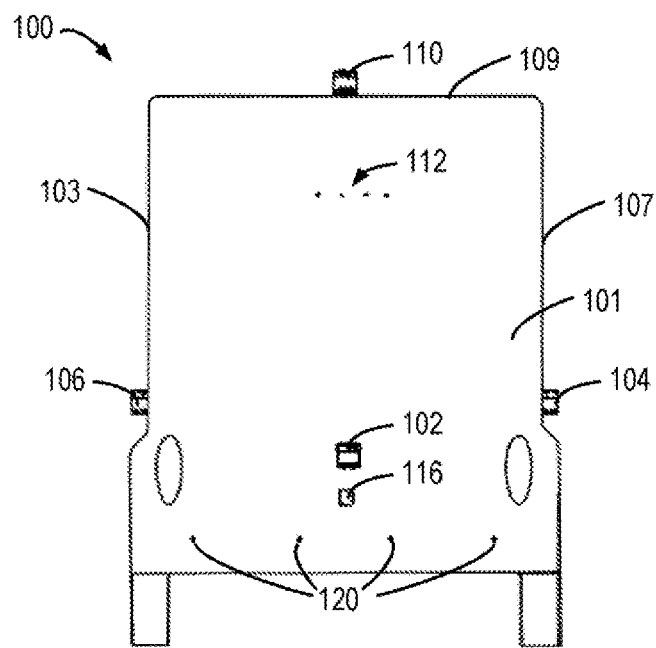
FIG. 3 is a front view of an autonomous vehicle according to some embodiments of the present disclosure.

An autonomous vehicle 100 according to an embodiment of the present disclosure will be described in detail in conjunction with FIGS. 1 to 3, wherein FIGS. 1 and 2 are perspective views of the autonomous vehicle, and FIG. 3 is a front view of the autonomous vehicle. For example, the autonomous vehicle 100 may be an L4 autonomous vehicle. It should be understood that the autonomous vehicle 100 is only provided as an example, and those skilled in the art may make various appropriate modifications to the type, arrangement, number, etc. of sensors without departing from the scope of the present disclosure.

As shown in FIGS. 1 to 3, the autonomous vehicle 100 comprises a plurality of side portions, including a front side 101, a left side 103, a right side 105, and a rear side 107. A plurality of side laser radars are respectively provided on these side portions of the autonomous vehicle 100. For example, a first laser radar 102 is provided on the front side 101, a second laser radar 104 is provided on the left side 103, a third laser radar 106 is provided on the right side 105, and a fourth laser radar 108 is provided on the rear side 107. These side laser radars are partially embedded in corresponding side portions of these side portions respectively. The first laser radar 102 and the fourth laser radar 108 may be arranged in the middle, while the second laser radar 104 and the third laser radar 106 may be provided in the front end or rear end according to a specific structure of the vehicle. For example, by provision in the front end of the vehicle, the fields of view of the second laser radar 104 and the third laser radar 106 may focus more on the front left and front right of the vehicle, which is particularly applicable to a case where a top laser radar 110 is provided in the rear end of the vehicle. Similarly, by provision in the rear end of the vehicle, the fields of view of the second laser radar 104 and the third laser radar 106 may focus more on the rear left and rear right of the vehicle, which is particularly applicable to a case where the top laser radar 110 is provided in the front end of the vehicle. It should be understood that according to the specific structure of the vehicle and the general condition of the sensors, the second laser radar 104 and the third laser radar 106 may also be provided on any other suitable positions on the side portions.

A side laser radar is partially embedded in the autonomous vehicle 100, so that compared with a traditional arrangement manner of completely exposed laser radars, the attractiveness of the vehicle is improved, and laser radars are not prone to faults such as bumps. In addition, since a plurality of laser radars are provided, the fields of view of the laser radars can be guaranteed to ensure the safety of the autonomous vehicle 100.

Figure 2A:
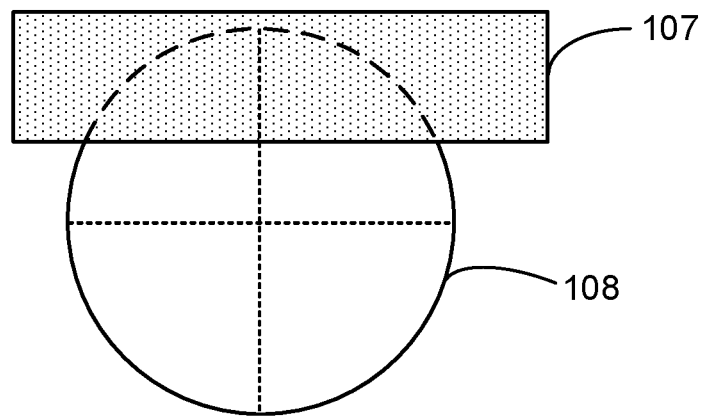
FIG. 2A is a top view top view of an embedded portion of a laser radar inside a wall of an autonomous vehicle.

In some embodiments, an embedded portion of each side laser radar has a radius not more than the radius of the side laser radar (see, e.g., FIG. 2A). In this way, the impact on the fields of view of the laser radars is reduced as much as possible while the attractiveness of the vehicle is improved.

In some embodiments, a central axis of the first laser radar 102 may tilt downward by 5 to 10 degrees with respect to the front side 101. In addition, a central axis of the fourth laser radar 108 may be parallel to the rear side 107, that is, parallel to a vertical direction. The vertical direction represents a height direction of the vehicle, and is usually perpendicular to the ground. The laser radar is usually designed as a column structure, and the central axis represents an axis passing through the center of the laser radar, that is, a geometrical central axis of rotation.

As shown in FIGS. 1 to 3, the top laser radar 110 is provided on a top portion 109 of the autonomous vehicle 100 for positioning and sensing. For example, the top laser radar 100 may detect a static environment (such as buildings and trees) around the vehicle for positioning. The top laser radar 110 may obtain the environmental information around the autonomous vehicle 100 together with these side laser radars. In the shown embodiments, the top laser radar 110 is provided in the rear end of the top portion 109 of the vehicle. Alternatively, the top laser radar 110 may also be provided in the front end of the top portion 109 of the vehicle.

In some embodiments, as shown in FIGS. 1 and 2, a central axis of the top laser radar 110 may tilt backward by 5 to 15 degrees with respect to the vertical direction. In this way, the promotion sensing range of the top laser radar 110 may be improved. Alternatively, when the top laser radar 110 is provided on other positions, the central axis thereof may be provided to tilt by a similar angle in other ways.

As shown in FIGS. 1 and 3, the autonomous vehicle 100 further comprises a plurality of cameras 112, these cameras 112 being provided horizontally on the front side 101 and configured to collect an optical image in front of the vehicle 100. These cameras 112 have focal lengths different from each other. In a shown example, 4 cameras 112 are shown, 2 of which may be used for traffic light recognition. The cameras 112 may be embedded in the back of the windshield, thereby achieving the effect of attractiveness without affecting their functions. By providing the cameras 112 horizontally in a row; a better data integration effect can be achieved. As shown in FIG. 2, the autonomous vehicle 100 further comprises a wide-angle camera 114, which is provided on the rear side 107 of the autonomous vehicle 100 and configured to collect an optical image behind the autonomous vehicle 100.

As shown in FIGS. 1 and 3, the autonomous vehicle 100 further comprises a first millimeter-wave radar 116, which is provided on the front side 101 of the autonomous vehicle 100 and configured to collect a microwave image in front of the autonomous vehicle 100. As shown in FIG. 2, the autonomous vehicle 100 further comprises a second millimeter-wave radar 118, which is provided on the rear side 107 of the autonomous vehicle 100 and configured to collect a microwave image behind the autonomous vehicle 100. With the feature of millimeter waves, the millimeter-wave radars 116 and 118 may perform middle-range and long-range obstacle recognition.

As shown in FIGS. 1 to 3, the autonomous vehicle 100 further comprises a plurality of ultrasonic radars 120, which are respectively provided on the plurality of side portions of the autonomous vehicle 100 and configured to collect an ultrasound image around the autonomous vehicle 100. For example, 2 or 4 ultrasonic radars 120 may be provided on each side portion. With the feature of ultrasonic waves, the ultrasonic radars 120 may perform short-range obstacle recognition.

According to the embodiments of the present disclosure, different types of sensors are provided, so that the sensing blind spot of the autonomous vehicle may be avoided, and the L4 autonomous driving can be better achieved.

Although some specific embodiments of the present disclosure have been illustrated in detail through examples, those skilled in the art should understand that the foregoing examples are only intended to be exemplary and not to limit the scope of the present disclosure. Those skilled in the art should understand that the above-mentioned embodiments may be modified without departing from the scope and essence of the present disclosure. The scope of the present disclosure is defined by the appended claims.

The reference to any prior art in this specification is not and should not be taken as acknowledgment implying that the prior art constitutes common general knowledge.

What is claimed is:

1. An autonomous vehicle, comprising:
a plurality of side laser radars provided on a plurality of side portions of the autonomous vehicle, respectively, wherein each side laser radar of the plurality of side laser radars is partially embedded in a corresponding side portion of the plurality of side portions; and
a top laser radar provided on a top portion of the autonomous vehicle, wherein the top laser radar and the plurality of side laser radars are configured to obtain environmental information around the autonomous vehicle:
wherein the plurality of side laser radars are designed as column structures, and an embedded portion of each side laser radar of the plurality of side laser radars has a size not greater than a radius of the side laser radar.

2. The autonomous vehicle according to claim 1, wherein the plurality of side laser radars comprise:
a first laser radar provided on a front side of the autonomous vehicle and partially embedded in the front side of the autonomous vehicle:
a second laser radar provided on a left side of the autonomous vehicle and partially embedded in the left side of the autonomous vehicle:
a third laser radar provided on a right side of the autonomous vehicle and partially embedded in the right side of the autonomous vehicle; and
a fourth laser radar provided on a rear side of the autonomous vehicle and partially embedded in the rear side of the autonomous vehicle.

3. The autonomous vehicle according to claim 2, wherein:
the second laser radar is located in a front end or rear end of the left side of the autonomous vehicle; and
the third laser radar is located in a front end or rear end of the right side of the autonomous vehicle.

4. The autonomous vehicle according to claim 1, wherein the top laser radar is provided in a front end or rear end of the top portion of the autonomous vehicle.

5. The autonomous vehicle according to claim 2,
wherein a central axis of the first laser radar tilts downward by 5 to 10 degrees with respect to the front side of the autonomous vehicle; and
wherein a central axis of the fourth laser radar is parallel to the rear side of the autonomous vehicle.

6. The autonomous vehicle according to claim 1, wherein a central axis of the top laser radar tilts by 5 to 15 degrees with respect to a vertical direction.

7. The autonomous vehicle according to claim 1, further comprising:
a plurality of cameras horizontally provided on a front side of the autonomous vehicle and configured to collect an optical image in front of the autonomous vehicle, wherein each camera of the plurality of cameras has a focal length that is different from the focal lengths of the other cameras of the plurality of cameras; and
a wide-angle camera provided on a rear side of the autonomous vehicle and configured to collect an optical image behind the autonomous vehicle.

8. The autonomous vehicle according to claim 1, further comprising at least one selected from a group consisting of:
a first millimeter-wave radar provided on a front side of the autonomous vehicle and configured to collect a microwave image in front of the autonomous vehicle; and
a second millimeter-wave radar provided on a rear side of the autonomous vehicle and configured to collect a microwave image behind the autonomous vehicle.

9. The autonomous vehicle according to claim 1, further comprising:
a plurality of ultrasonic radars provided on the plurality of side portions of the autonomous vehicle, respectively, wherein the plurality of ultrasonic radars are configured to collect an ultrasound image around the autonomous vehicle.

10. The autonomous vehicle according to claim 1, wherein the autonomous vehicle is an L4 autonomous vehicle.

11. The autonomous vehicle according to claim 2, wherein the second laser radar is located in a front end or rear end of the left side of the autonomous vehicle.

12. The autonomous vehicle according to claim 2, wherein the third laser radar is located in a front end or rear end of the right side of the autonomous vehicle.

13. The autonomous vehicle according to claim 2, wherein a central axis of the first laser radar tilts downward by 5 to 10 degrees with respect to the front side of the autonomous vehicle.

14. The autonomous vehicle according to claim 2, wherein a central axis of the fourth laser radar is parallel to the rear side of the autonomous vehicle.

* * * * *

UNITED STATES PATENT AND TRADEMARK OFFICE
CERTIFICATE OF CORRECTION

PATENT NO. : 12,174,319 B2  
APPLICATION NO. : 17/670504  
DATED : December 24, 2024  
INVENTOR(S) : Ju et al.

Page 1 of 1

It is certified that error appears in the above-identified patent and that said Letters Patent is hereby corrected as shown below:

In the Claims

Claim 1: Column 5, Line 38: "vehicle:" should read -- vehicle; --.

Claim 2: Column 5, Line 47: "of the autonomous vehicle:" should read -- of the autonomous vehicle; --.

Claim 2: Column 5, Line 50: "side of the autonomous vehicle:" should read -- side of the autonomous vehicle; --.

Signed and Sealed this  
First Day of April, 2025

Coke Morgan Stewart  
*Acting Director of the United States Patent and Trademark Office*